(12) United States Patent
Lopes et al.

(10) Patent No.: US 6,256,494 B1
(45) Date of Patent: Jul. 3, 2001

(54) METHOD OF AND APPARATUS FOR ESTIMATING A CHARACTERISTIC OF A SIGNAL

(75) Inventors: Luis Lopes; Eric Villier; Brendan Ludden, all of Swindon (SN)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/442,792

(22) Filed: Nov. 18, 1999

(30) Foreign Application Priority Data

May 8, 1999 (GB) .................................................. 9910552

(51) Int. Cl.⁷ ........................................................ H04Q 7/20
(52) U.S. Cl. ........................ 455/423; 455/226.1; 455/67.4
(58) Field of Search ................................ 455/423, 67.4, 455/226.1, 500, 575, 115; 375/340; 370/335; 342/457

(56) References Cited

U.S. PATENT DOCUMENTS

| | | | |
|---|---|---|---|
| 4,058,713 | * 11/1977 | Ditoro | 364/724 |
| 5,276,706 | * 1/1994 | Critchlow | 375/13 |
| 5,475,710 | * 12/1995 | Ishizu et al. | 375/232 |
| 5,515,062 | * 5/1996 | Maine et al. | 342/457 |
| 5,537,443 | * 7/1996 | Yoshino et al. | 375/340 |
| 5,675,344 | * 10/1997 | Tong et al. | 342/457 |
| 5,691,727 | * 11/1997 | Cyzs | 342/361 |
| 5,703,902 | * 12/1997 | Ziv et al. | 375/200 |
| 5,802,105 | * 9/1998 | Tiedemann, Jr. et al. | 375/225 |
| 5,838,672 | * 11/1998 | Ranta | 370/335 |
| 5,872,820 | * 2/1999 | Upadrasta | 375/356 |
| 5,970,414 | 10/1999 | Bi et al. | 455/456 |
| 5,991,330 | * 11/1999 | Dahlman et al. | 375/200 |
| 6,026,130 | * 2/2000 | Rahmatullah et al. | 375/340 |
| 6,034,635 | * 3/2000 | Gilhousen | 342/457 |
| 6,040,800 | * 3/2000 | Raith et al. | 342/387 |

FOREIGN PATENT DOCUMENTS

WO 00/11804 * 3/2000 (CN) ................................ H03C/1/62

OTHER PUBLICATIONS

PCT International Search Report dated Sep. 22, 2000.

* cited by examiner

*Primary Examiner*—Daniel Hunter
*Assistant Examiner*—C. Chow
(74) *Attorney, Agent, or Firm*—Heather L. Mansfield; Lalita P. Williams

(57) ABSTRACT

This invention relates to a method of estimating a characteristic of a signal such as a time of arrival or a transmitter identity in particular in a cellular communication system. Most known techniques have limited performance as they rely on limited amounts of known data. The method of the invention comprise a first step (201) of receiving the signal at a subscriber unit. In a second step (203) the subscriber unit receives assistance data from the fixed network and in a third step (205) an expected signal is derived in response to this assistance data. For GSM the assistance data can be a frame number and a BSIC permitting an entire expected SCH burst to be derived. In a fourth (207) step the signal characteristic is determined by correlation of the received signal and the expected signal. The invention is particularly applicable to location determination in a GSM communication system.

14 Claims, 2 Drawing Sheets

-PRIOR ART-

METHOD OF AND APPARATUS FOR ESTIMATING A CHARACTERISTIC OF A SIGNAL

FIELD OF THE INVENTION

This invention relates to a method of and apparatus for estimating a characteristic of a signal and in particular estimating a transmitter identity or time of arrival of a signal in a cellular communication system.

BACKGROUND OF THE INVENTION

In a cellular communication system each of the subscriber units (typically mobile stations or small portable terminals) communicates with typically a fixed base station. Communication from the subscriber unit to the base station is known as uplink and communication from the base station to the subscriber unit is known as downlink. The total coverage area of the system is divided into a number of separate cells, each predominantly covered by a single base station. The cells are typically geographically distinct with an overlapping coverage area with neighbouring cells. FIG. 1 illustrates a cellular communication system 100. In the system, a base station 101 communicates with a number of subscriber units 103 over radio channels 105. In the cellular system, the base station 101 covers users within a certain geographical area 107, whereas other geographical areas 109, 111 are covered by other base stations 113, 115.

As a subscriber unit moves from the coverage area of one cell to the coverage area of another cell, the communication link will change from being between the subscriber unit and the base station of the first cell, to being between the subscriber unit and the base station of the second cell. This is known as a handover. Specifically, some cells may lie completely within the coverage of other larger cells.

All base stations are interconnected by a fixed network. This fixed network comprises communication lines, switches, interfaces to other communication networks and various controllers required for operating the network. A call from a subscriber unit is routed through the fixed network to the destination specific for this call. If the call is between two subscriber units of the same communication system the call will be routed through the fixed network to the base station of the cell in which the other subscriber unit currently is. A connection is thus established between the two serving cells through the fixed network. Alternatively, if the call is between a subscriber unit and a telephone connected to the Public Switched Telephone Network (PSTN) the call is routed from the serving base station to the interface between the cellular mobile communication system and the PSTN. It is then routed from the interface to the telephone by the PSTN.

In a communication system such as the Global System for Mobile communication (GSM), the subscriber units and base stations perform a number of measurements in order to evaluate the performance of the communication link between the subscriber units and base stations. These measurements are used for determination of best serving base station, hand over decisions, power control etc. Furthermore, it is also proposed to perform a number of measurements, which can be used to derive information of the received signals which can be used for other purposes. Notably, it has been proposed to perform location determination of a subscriber unit from measurements performed on the signals transmitted from base stations.

A known method of location determination consists in determining a distance between an object and a number of fixed positions. For example, in a cellular radio communication system such as the GSM communication system, the location of a subscriber unit can be determined by estimating the range from the subscriber unit to a number of fixed base stations with known locations. If the location must be determined in three dimensions, the range between the subscriber unit and at least three base stations must be determined. This is known as triangulation.

It is known to determine the range between the base stations from the time of arrival of signals transmitted between the subscriber unit and the base station. For example, if a signal is transmitted by a base station to the subscriber unit, the time of arrival will depend on the propagation delay which is proportional to the distance travelled by the radio signal. If the time of transmission is known, the relative time of arrival can be calculated and this will correspond to the range between the base station and the subscriber unit. Typically, the subscriber units are not synchronised with the base stations, and the location is determined from the difference in the time of arrival of signals from different base stations. In this case, signals from at least one additional base station must be received by the subscriber unit. The same general principle applies when location determination is based on transmitting signals from the subscriber unit to the base stations.

In order to determine the location of a subscriber unit according to this method the subscriber unit needs to determine a number of characteristics of the received signals. Notably, the subscriber unit must be able to determine a time of arrival of a signal and also the identity of the base station, which transmitted the signal.

It is known to determine various signal characteristics from comparison of a received signal with a known value of what the transmitted signal is. For example, a GSM subscriber unit can estimate the time of arrival of signals transmitted from various base stations by cross-correlating the received signal by the local replica of the signal to be detected. The training sequence of the GSM bursts can be used for that purpose, whether it is a normal burst, dummy burst or synchronisation burst (SCH) as this information is known for all bursts.

Another example is for a GSM subscriber unit to estimate the identity of the transmitting base station. This is essential for location determination as the subscriber unit has to be sure that the signal it is trying to detect emanates from a given base station and not from one of the co-channel interferers. One possibility is to try and decode every SCH, using the transmitted Base Station Identity Code (BSIC) and comparing this to the known BSIC of the wanted base station. Unfortunately, because the broadcast carrier (BCCH carrier) on which the BSIC is transmitted has a high frequency reuse factor, the strength of the signal from neighbour base stations can be fairly low leading to a wrong decoding of the frame.

The signal to noise ratio will often be sufficient to enable determination of a time of arrival but not sufficient to decode the BSIC and this method is thus very inefficient.

Known methods of estimating signal characteristics such as time of arrival and transmitter identity are thus inefficient, inaccurate and unreliable and an improved method is desirable.

SUMMARY OF THE INVENTION

The current invention seeks to alleviate the disadvantages of the known methods of estimating signal characteristics such as time of arrival and transmitter identity, and to provide more accurate and reliable estimates.

Accordingly there is provided a method of estimating a characteristic of a signal having at least partly a varying information content, the method comprising the steps of receiving the signal; receiving assistance data comprising compressed data related to the information content of the signal in a known way; deriving an expected signal in response to the assistance data; and determining the characteristic of the signal in response to both the expected signal and the received signal.

Preferably the characteristic is either a time of arrival or a transmitter identity. According to a feature of the invention, the method is used in a GSM communication system wherein the assistance data comprise a frame number, a frame number offset and/or the Base Station Identity Code.

According to a second aspect of the invention there is provided a communication system operable to use a method of determining a characteristic of a signal in accordance with the above method.

According to a third aspect of the invention there is provided a base station operable to use a method of determining a characteristic of a signal in accordance with the above method.

According to a fourth aspect of the invention there is provided a subscriber unit operable to use a method of determining a characteristic of a signal in accordance with the above method.

The invention thus provides an improved determination of signal characteristics such as time of arrival and transmitter identity by using assistance data in the estimation of the signal characteristic.

BRIEF DESCRIPTION OF THE DRAWINGS

An embodiment of the present invention is described below, by way of example only, with reference to the Drawings, in which.

DETAILED DESCRIPTION OF A PREFERRED EMBODIMENT

The following description focuses on an embodiment compliant with the GSM communication system and specifically it is given in the context of a handset-assisted location technique for GSM. However it will be apparent that the invention is not limited to this application.

Figure 1:
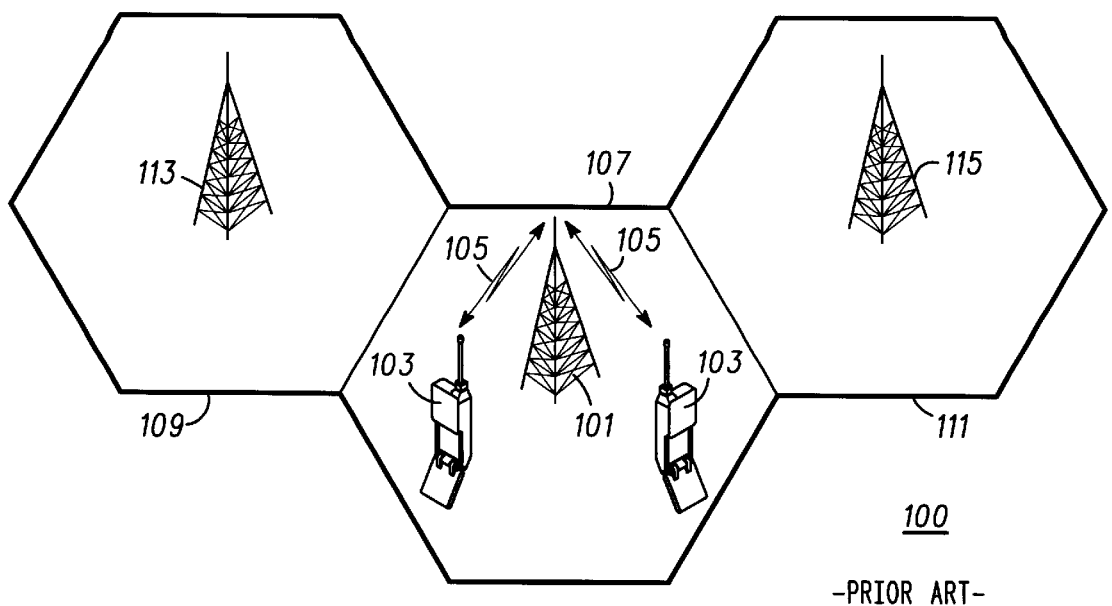
FIG. 1 is an illustration of a cellular communication system according to prior art.
Figure 2:
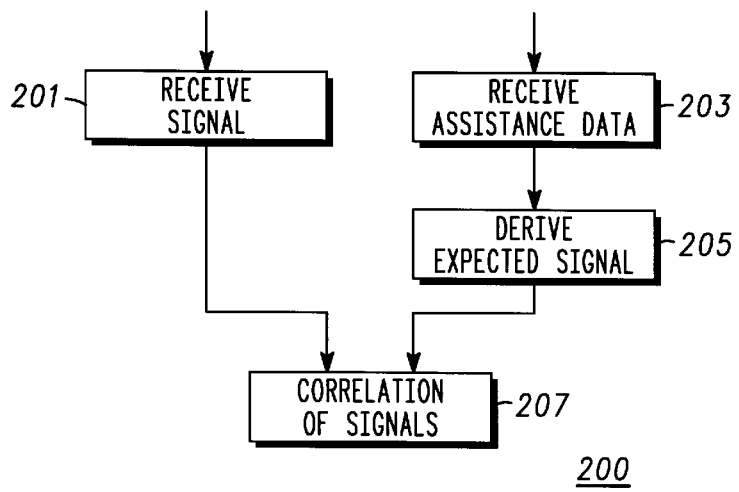
FIG. 2 shows a flow chart of a method in accordance with an embodiment of the invention.
Figure 3:
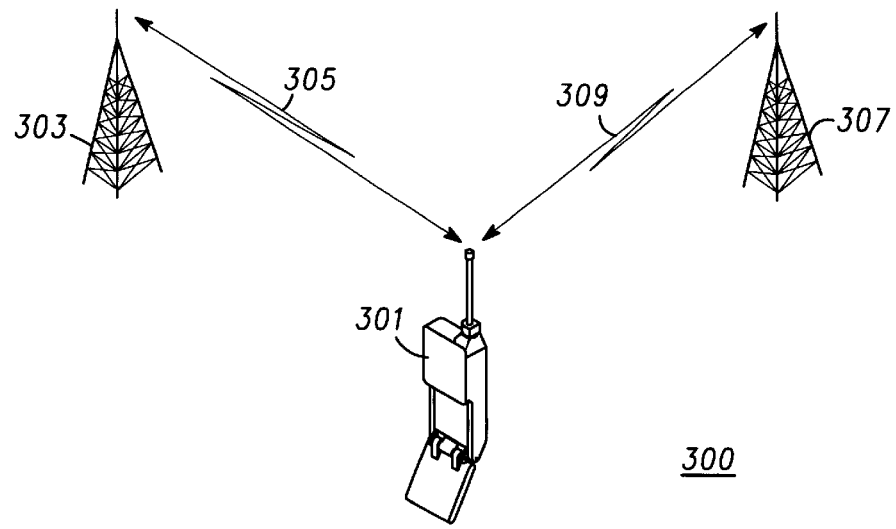
FIG. 3 shows part of a communication system to which the invention is applicable.

FIG. 2 shows a flow chart 200 of a method in accordance with an embodiment of the invention. FIG. 3 shows an example of part of a GSM communication system 300 in which the method is applied.

In the embodiment shown in FIG. 3, the subscriber unit 301 is performing location determination. It therefore needs to receive a signal from three or more base stations and to determine at least a time of arrival of the signal received from these base stations. As shown in FIG. 3, a serving base station 303 is in communication with the subscriber unit 301 through a radio communication link 305. Typically there will be exchange of information in both directions between the subscriber unit 301 and the serving base station 303.

In addition a non-serving base station 307 transmits a broadcast signal which reaches the subscriber unit 301 through a communication link 309. The subscriber unit 301 will determine a characteristic of this signal, which in the described embodiment is a time of arrival of the signal. This time of arrival signal is subsequently used for location determination as is well known in the art. Typically, although the subscriber unit 301 is able to detect the signal from the non-serving base station 307 it may not receive this with sufficient signal to noise ratio to demodulate and decode the data. Furthermore, there is typically no communication from the subscriber unit 301 to the non-serving base station 307.

Figure 4:
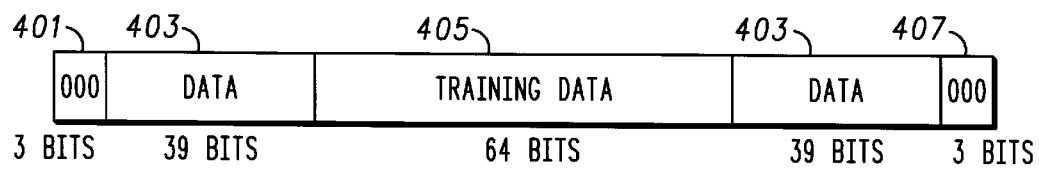
FIG. 4 illustrates the data content of a GSM SCH burst.

FIG. 2 shows the method for determining the time of arrival of the signal from the non-serving base station 307 in accordance with the described embodiment of the invention. In step 201 the subscriber unit 301 receives a signal from the non-serving base station 307. The received signal samples are stored for subsequent processing. In step 203 the subscriber unit 301 receives assistance data which is data assisting the subscriber unit 301 in being able to generate a local replica of the signal for which a characteristic is to be determined. In the described embodiment this assistance data is received from the serving base station 303 and is therefore received with high reliability. The assistance data relates to the signal for which a characteristic is to be derived, in this case to the signal transmitted from the non-serving base station 307. The assistance data can be received before, after or simultaneously with reception of the signal from the non-serving base station 307. The signal transmitted from the non-serving base station 307 will contain at least a part that has a varying information content and thus which is not known by the subscriber unit 301. In addition the signal may contain a predetermined part which can be known in advance by the subscriber unit 301. An example is an SCH burst 400 in a GSM system, which as shown in FIG. 4 is made up from 3 start bits 401, 78 data bits 403, 64 training bits 405 and 3 trail bits 407. The value of the start bits, the training bits and the trail bits are known whereas the data bits are not known. The information content of the data bits of the SCH burst are given by encoding of 6 base station identity bits (the BSIC) and 19 bits relating to the current frame number.

In step 205 an expected signal is derived in response to the assistance data. In the example of the signal transmitted from the non-serving base station 307 being an SCH burst, the assistance data thus comprise information permitting the subscriber unit 301 to generate a local replica of the transmitted SCH burst and thus an expected value of the signal, which is received. The assistance data can thus be any data fully or partially allowing an expected value of at least part of the signal corresponding to the varying information content to be derived. In the example the subscriber unit will be provided with some assistance data, namely the frame number (FN) of the SCH of the wanted base station, i.e. the non-serving base station 307 in the example shown in FIG. 3. One way of doing this in GSM would be to define new messages, which can be included in the broadcast signal of the serving base station 303. Alternatively, instead of passing the frame number of the non-serving base station 307, a frame offset between the serving 303 and non-serving base station 307 can be provided to the subscriber unit 301. In addition the subscriber unit 301 is provided with BSIC information, if not already known, and the subscriber unit 301 will thus have all necessary information to generate a local replica of the entire SCH burst.

In one embodiment of the invention the information is furthermore used to select the signal for which a characteristic is to be determined. Specifically, by providing a frame offset to the subscriber unit this can determine when an SCH burst of the non-serving base station can be expected and it can thus confine the search for the signal to a window around the time of arrival. If the frame offset furthermore includes a time slot offset between the serving and non-serving base station, the uncertainty of the time of arrival is reduced significantly and the window can thus be reduced.

Furthermore, passing these data to the subscriber unit needs only to be done once, since the subscriber unit is capable of keeping track of the frame number. This information, together with the already known BSIC, allows the subscriber unit to synthesise the whole SCH burst (148 bits) and to use it as a local replica of the expected signal, instead of just using the usual training sequence.

In step 207, a signal characteristic of the signal is derived in response to the signal itself and to the derived expected signal.

Specifically, a time of arrival can be determined by cross-correlating the received signal samples with corresponding samples of the derived expected signal. The time of arrival can be found from the time offset between the stored local replica and the received signal samples as is well known in the art.

Alternatively, the identity of the transmitter of the signal can also be determined by cross-correlation. Due to the different BSIC and frame numbers of different base station the SCH bursts will be significantly different for bursts from different base stations. The correlation between a signal from one base station and an expected signal derived for a second different base station is therefore significantly lower than for a signal received from the second base station. The amplitude of the correlation is thus an indication of the identity of the transmitter of the received signal.

Furthermore, the correlation between the expected signal and the received signal also has the effect of discriminating between the wanted signal and co-channel interferers. Increasing the window over which the correlation can be performed from the training sequence to the entire burst thus also improves the discrimination between the wanted and unwanted signals.

It will be apparent that the invention is not limited to determining the characteristic by correlation but that any known method such as comparison or e.g. the least square estimation algorithm can be substituted without subtracting from the invention.

In the described embodiment not only a significant improvement in the estimation is achieved but at the same time the method allows reliable identification of the transmitting base station.

The improvement in the sensitivity of the estimation of the time of arrival in the specific case of using a full SCH burst rather than just the training data can be found from the Cramér-Rao bound applied to the maximum-likelihood estimator of the time of arrival τ of a signal. In the simple case where the signal is subject to an additive white Gaussian noise. The Cramér-Rao bound is:

$$\text{var}(\tau) \geq \left(2\frac{E_s}{N_0}\beta^2\right)^{-1},$$

where $E_S$ is the signal energy, $N_0$ is the noise power spectral density and $\beta^2$ is the second moment of the signal spectrum $S(\omega)$ defined by:

$$\beta^2 = \frac{1}{E_s}\int_{-\infty}^{+\infty}\omega^2|S(\omega)|^2 d\omega.$$

Since the signal of interest here is in the context of digital communications, it is more convenient to use the energy per bit $E_b$ instead of the signal energy $E_S = nE_b$ (n=number of bits). Since the signal using the 64-bit training sequence is different from the signal using the whole burst, the latter depending on the BSIC and frame number, the second moments of their spectrum should be different. Strictly speaking it is true, but they are not much different and, once the signals have been low-pass filtered by the RF front-end of the receiver, the difference is even less visible. So the major difference is in the number of bits n between the two signals. The improvement is then roughly about:

$$10 \log_{10}\frac{148}{64} \approx 4 \text{ dB}.$$

As a result of using the current invention in the specific embodiment described an improved accuracy of 4 dB is obtained for the signal to noise ratio or alternatively the same performance can be achieved at signal to noise ratio 4 dB worse than for known techniques.

The invention thus provides an improved determination of signal characteristics such as time of arrival and transmitter identity by using assistance data in the estimation of the signal characteristic. It is apparent that the invention is not limited to estimating of time of arrival or transmitter identity but is useful for estimating many different characteristics including signal detection, angle of arrival determination etc.

What we claim is:

1. A method of estimating a characteristic of a first signal having at least partly a varying information content, the method comprising the steps of, in a receiver:
   receiving, from a first transmitter, the first signal;
   receiving, from a second transmitter remote from the first transmitter, a second signal comprising assistance data comprising compressed data having a known relationship to the information content of the first signal;
   in response to the second signal, deriving an expected third signal in which said expected third signal is a replica of at least a part of the first signal;
   and correlating the first signal with the expected third signal to estimate the characteristic of the first signal.

2. A method of estimating a characteristic of a signal as claimed in claim 1 wherein the characteristic estimated is a time of arrival of the signal.

3. A method of estimating a characteristic of a signal as claimed in claim 1 wherein the characteristic estimated is an identity of a transmitter transmitting the signal.

4. A method of estimating a characteristic of a signal as claimed in claim 1 used in cellular communication system.

5. A method of estimating a characteristic of a signal as claimed in claim 1 wherein the signal is transmitted from a non-serving base station and the assistance data is transmitted from a serving base station and comprise information related to the information content of the signal transmitted from the non-serving base station.

6. A method of estimating a characteristic of a signal as claimed in claim 5 wherein the cellular communication system is a GSM cellular communication system.

7. A method of estimating a characteristic of the signal as claimed in claim 6 wherein the assistance data is a frame number of a non-serving base station transmitting the signal, and the expected signal is derived in response to this frame number.

8. A method of estimating a characteristic of a signal as claimed in claim 6 wherein the assistance data includes a frame number offset between the serving base station and the non-serving base station transmitting the signal, and the frame number offset is used to derive an expected time of arrival window of the signal.

9. A method of estimating a characteristic of a signal as claimed in claim 1 wherein the signal comprises an SCH burst.

10. A method of estimating a characteristic of a signal as claimed in claim 8 further comprising the step of tracking the frame numbers of transmissions from the non-serving base station.

11. A method of estimating a characteristic of the signal as claimed in claim 6 wherein the assistance data is a Base Station Identity Code of a non-serving base station transmitting the signal and the expected signal is derived in response to this Base Station Identity Code.

12. A communication system operable to use a method of determining a characteristic of a signal in accordance with claim 1.

13. A base station operable to use a method of determining a characteristic of a signal in accordance claim 1.

14. A subscriber unit operable to use a method of determining a characteristic of a signal in accordance with claim 1.

* * * * *